Sept. 15, 1959 L. A. RUSSELL 2,904,779

MAGNETIC CORE TRANSFER CIRCUIT

Filed Dec. 3, 1956

INVENTOR.
LOUIS A. RUSSELL

BY

Campbell, Brumbaugh, Free & Graves his ATTORNEYS

United States Patent Office 2,904,779

Patented Sept. 15, 1959

2,904,779

MAGNETIC CORE TRANSFER CIRCUIT

Louis A. Russell, Poughkeepsie, N.Y., assignor to International Business Machines Corporation, New York, N.Y., a corporation of New York Application December 3, 1956, Serial No. 625,826

7 Claims. (Cl. 340—174)

The present invention relates to magnetic core circuits and, more particularly, to a new and improved shift register of the type employed in digital computing apparatus.

In one type of magnetic core shift register such, for example, as that disclosed in my copending patent application, Serial No. 528,594, filed August 8, 1955, and assigned to the assignee of the present invention, a coupling bore between successive storage cores limits the transfer of digital information to a forward direction only. After each operating cycle, the coupling cores must be reset to their original state of magnetic remanence. Since windings on the coupling cores are in series with the windings on the information storage cores, resetting must occur at a relatively slow rate to preclude the generation of unwanted potentials that would tend to destroy the digital information stored in the cores. Such a slow reset rate imposes undesirable limitations on the operating speed of the register.

Accordingly, it is one of the objects of the present invention to provide an improved magnetic core register transferring information without a resetting period.

Another object of the present invention is to provide a shift register of the above character using only magnetic cores.

Still another object of the present invention is to provide a magnetic shift register having the above characteristics in which coupling cores control the transfer of pulse information between storage cores.

These and further objects and advantages of the invention are accomplished by providing a series of pairs of storage cores coupled by coupling cores. The cores carry suitably connected windings responsive to shift pulses to transfer information alternately from each core in one pair of storage cores through a coupling core to corresponding cores in an adjacent pair of storage cores. While one transfer cycle switches the coupling core from its initial remanence state, the alternate transfer cycle switches the coupling core back to its original state making a resetting period unnecessary.

Each of the storage cores is biased to prevent undesired switching of one group of cores in response to switching by the shift pulses of the other cores. The shift pulses are also supplied to further coupling cores to hold them in their desired remanence state against currents induced in the register by pulse transfer.

For a more complete understanding of these and other objects and advantages of the present invention, reference may be had to the description which follows and to the accompanying drawings in which.

Figure 1:
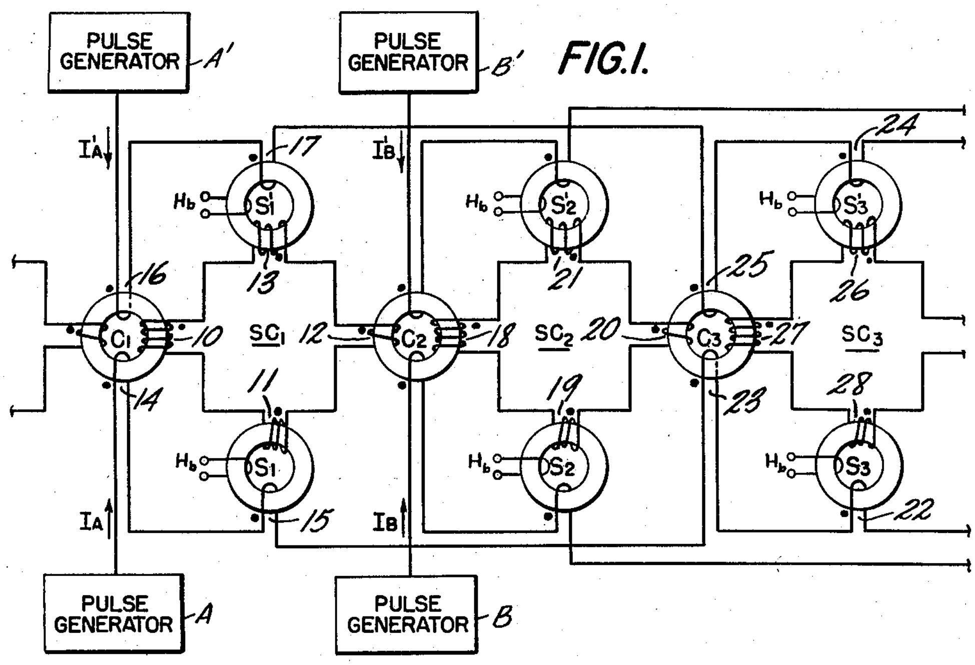
Figure 1 is a circuit diagram of a magnetic core shift register in accordance with the principles of the present invention.

Referring to a typical embodiment of the invention in greater detail with particular reference to Figure 1, magnetic storage and coupling cores designated by the letters "S" and "C" with appropriate suffixes form a magnetic core register. Each digital position in the register of Figure 1 includes two storage cores, for example $S_1$ and $S'_1$, associated with one coupling core, for example $C_1$, suitably connected together and to further stages. In the first stage of the register, a series circuit designated $SC_1$ includes an output winding 10 on a coupling core $C_1$, a winding 11 on a storage core $S_1$, an input winding 12 on a coupling core $C_2$ and a winding 13 on a storage core $S'_1$.

The windings 10 to 13, inclusive, have a predetermined turns ratio one to the other, assuming cores C and S have equal flux capacity. Thus, the windings 11 and 13 are formed by the same number of turns while the winding 10 has a greater number of turns than the windings 11 and 13 and these windings have a greater number of turns than winding 12. Corresponding windings in the other stages of the magnetic core register are similarly related.

Serially connected shift windings 14 and 15 selectively receive shift pulse $I_A$ from a pulse generator A which may be, for example, of the electron tube type, magnetic core drivers or transistor driven pulse transformers of the type described in copending application Serial No. 511,082 of J. B. Mackay et al., filed May 25, 1955. Other suitable types of pulse generators may also be used.

Further shift windings 16 and 17 on the core $C_1$ and $S'_1$ receive shift pulses $I'_A$ from a pulse generator A′ which may be similar to the pulse generator A. In a similar fashion, pulse generators B and B′ supply timed shift pulses to shift windings on cores $C_2$, $S_2$ and $S'_2$, and to subsequent alternate stages in the magnetic core register.

A second digital position including the storage cores $S_2$ and $S'_2$ is coupled by the coupling core $C_2$ to the first described stage, a series circuit $SC_2$ in this stage including an output winding 18 on the core $C_2$, a winding 19 on the core $S_2$, an input winding 20 on the core $C_3$ and a winding 21 on the core $S'_2$.

The core $C_3$ couples the second stage to still a further digital position which includes storage cores $S_3$ and $S'_3$, the former carrying a shift winding 22 in series with a winding 23 on the core $C_3$ and the windings 14 and 15. Similar serially connected shift windings 24 and 25 are carried by the cores $S'_3$ and $C_3$. A series circuit $SC_3$ in this stage includes windings 26, 27 and 28 on the cores $S'_3$, $C_3$ and $S_3$, respectively, and $S'_3$ and another input winding on a coupling core (not shown) in a following stage.

To assist in an understanding of the invention, a dot marking is placed adjacent each winding shown in Figure 1 to indicate relative polarity such that an electric current flowing into a dot-marked terminal tends to switch the associated magnetic core to a binary "zero" state of remanence. Conversely, if an electric current flows into an unmarked terminal, the developed magnetic force tends to switch the associated magnetic core to a binary "one" remanence state.

Each of the storage and coupling cores will present a high or a low impedance to the flow of electric current depending on the direction of the current and on the polarity, or remanence state, of a particular core. For example, if an electric current is flowing into the unmarked terminal of a winding thereby tending to establish a "one" state of magnetic remanence therein, the core being originally magnetized in the opposite remanence state, in reversing the state of magnetic remanence of the core a high impedance will be presented to the current flow. On the other hand, if an electric current is flowing into a dot-marked terminal of a winding tending to establish a "zero" state of magnetic remanence therein and the core is already in the "zero" state, a low impedance is presented to the current flow.

Figure 2:
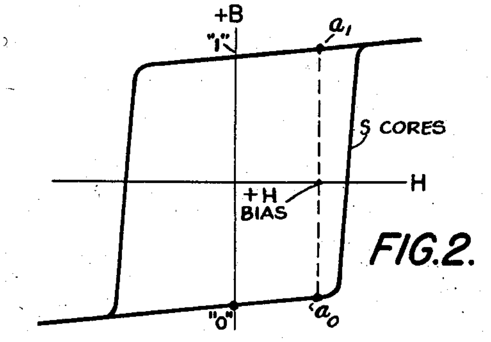
Figure 2 illustrates hysteresis characteristics for magnetic materials used in storage cores of the Figure 1 shift register.

The hysteresis loop illustrated in Figure 2 is representative of a typical characteristic for a square-loop ferrite core composition used in the storage cores S, with the vertical axis representing magnetic flux density B and the horizontal axis representing the applied field strength H. The residual flux density ($B_r$) is a large portion of the saturation flux density ($B_s$) and the curve has substantially square knees which is indicative of a well defined threshold coercive force. When the magnetic storage cores are magnetized in a positive direction, the binary "one" state is designated as shown in the drawing and when the magnetic storage cores are magnetized in the opposite direction, the binary "zero" state is represented arbitrarily thereby. Electric current flowing into a dot-marked terminal on any winding reads "zero" into the magnetic core associated therewith.

A D.-C. bias applied to each of the storage cores S through the windings $H_b$ or alternatively, by the shift windings, biases these cores to a point $a_0$ or $a_1$, slightly less than the threshold, towards saturation in the "one" direction for a purpose that will be explained in detail hereinafter.

Figure 3:
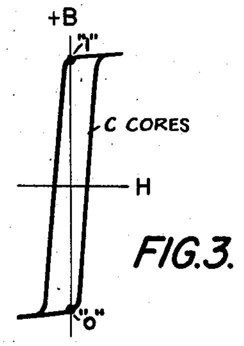
Figure 3 illustrates hysteresis characteristics for magnetic material used in coupling cores of the shift register.

In contrast to the square-loop magnetic material required for the storage cores S, the coupling cores C are preferably switched by a much lower coercive force than the storage cores, a typical hysteresis characteristic of the material forming the coupling cores being illustrated in Figure 3. The primary requirement for the coupling cores is that they be capable of attaining opposite stable remanence states and switch rapidly in response to an applied magnetomotive force (mmf.).

In a typical operation of the magnetic storage core register illustrated in Figure 1, it will be assumed that the storage cores $S_1$ and $S'_1$ are magnetized in the "one" remanence state and that all other cores are in the "zero" state. In order to shift the "one" from the $S_1$ and $S'_1$ storage cores to the $S_2$ and $S'_2$ storage cores, the pulse generator A supplies a shift pulse $I_A$ through the winding 14 to the dotted terminal of the winding 15 sufficient to overcome the bias on the storage core $S_1$. Therefore, its remanence state is switched from "one" to "zero" resulting in the generation of a voltage in the winding 11 which causes a counterclockwise flow of current in the series circuit $SC_1$ of a magnitude slightly less than $2I_0/N_1$ where $I_0$ is the threshold current per turn for the storage cores S, and $N_1$ represents the number of turns on the windings 11 and 13. Since this current flows into the unmarked terminal of the winding 12 on the coupling core $C_2$, its remanence state changes from "zero" to "one," it being remembered that the number of turns $N_2$ on the winding 12 is less than $N_1$ (assuming that the storage and coupling cores have the same flux capacity). However, the bias on the storage core $S'_1$ prevents any change in the remanence state of the storage core $S'_1$ even though the current flows into the dotted terminal of the winding 13. The current flow into the dot-marked terminal of the core $C_1$ has no effect since this core is already in its "zero" remanence state.

Switching the coupling core $C_2$ from "zero" to "one" induces a voltage in its output winding 18 resulting in a counterclockwise current flow in the series circuit $SC_2$ where $N_3$ is the number of turns on the winding 18. It will be recalled that the winding 18 is formed of a greater number of turns $N_3$ than the winding 12 and winding 19, so that slightly less than $N_2/N_3 \times 2I_0/N_1$ current flows into the unmarked terminal of the winding 19 on the storage core $S_2$ which is sufficient to switch its remanence state from "zero" to "one."

The same current flowing into the unmarked terminal of the winding 20 tends to read a "one" into the coupling core $C_3$. However, current flowing into the dotted terminal of the winding 23 in response to the shift pulse $I_A$ holds the coupling core $C_3$ in its "zero" state. Current flowing into the dot-marked terminal of the storage core $S'_2$ will be of no effect and accordingly, as a result of the $I_A$ shift pulse, the storage core $S_1$ has been changed from "one" to "zero" and the storage core $S_2$ and coupling core $C_2$ switched from "zero" to "one."

It is evident that the switching core $S_3$ is unaffected by the shift pulse $I_A$ applied to the dotted terminal of the winding 22 since such core is already in its "zero" remanence condition. Accordingly, no current of any significance will flow in the series circuit $SC_3$.

Figure 4:
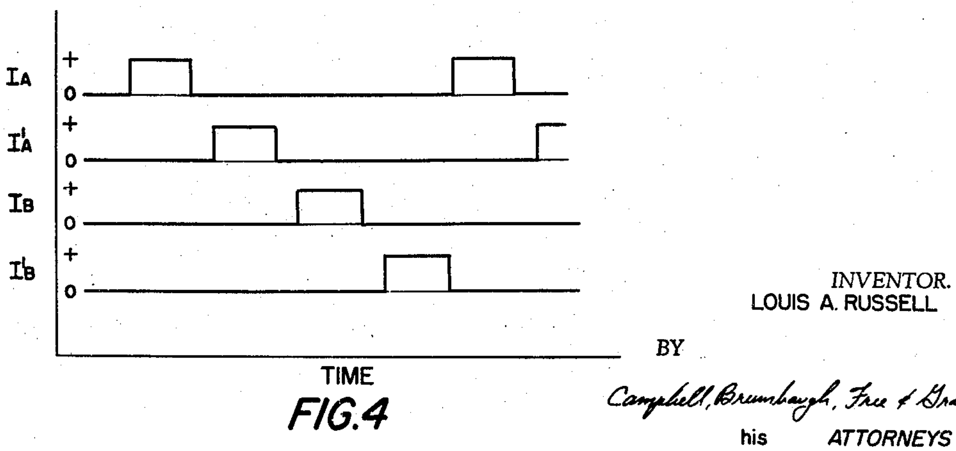
Figure 4 is a series of curves showing the timing sequence of shift pulses during one cycle of operation of the shift register.

Referring to the curves of Figure 4, a pulse $I'_A$ is initiated shortly after an $I_A$ pulse in order to transfer the "one" stored in the core $S'_1$ to the core $S'_2$. The shift pulse $I'_A$ flows into the dotted terminal of the winding 17 on the storage core $S'_1$ through the winding 16, thereby switching this storage core from "one" back to "zero." Such switching results in the generation of a voltage in the signal winding 13 causing a clockwise flow of current slightly less than $N_3/N_2 \times 2I_0/N_1$ in the series circuit $SC_1$. The winding 12 on the coupling core $C_2$, now in its "one" condition, receives this current at its dotted terminal to switch it back to "zero" which induces a voltage in its output winding 18. The current flow into the dot-marked winding 11 and unmarked winding 10 has no effect on their respective cores $S_1$ and $C_1$, the latter being held in its zero state by the shift pulse $I'_A$.

The induced voltage in the winding 18 as the core $C_2$ switches causes a clockwise current slightly less than $2I_0/N_1$ to flow in the series circuit $SC_2$ into the unmarked terminal of the winding 21 on the storage core $S'_2$, thereby switching its remanence state to "one." The clockwise current also flows through the winding 20 on the coupling core $C_3$ in a direction tending to maintain "zero" therein and into the dotted terminal of the winding 25 on the storage core $S_2$. However, due to the biased condition of the core $S_2$, this current is insufficient to switch it to the "zero" state.

In the foregoing cycle, information found in one pair of storage cores $S_1$ and $S'_1$ was transferred to the next successive pair of cores $S_2$ and $S'_2$. Subsequent $I_B$ and $I'_B$ shift pulses illustrated in Figure 4 will, in a similar manner, shift such information to the next successive pair of storage cores $S_3$ and $S'_3$. Thus, a magnetic core register has been provided that will shift information rapidly without the necessity for a relatively long reset period.

It will be understood that the above described embodiment of the invention is illustrative only and modifications thereof will occur to those skilled in the art. Therefore, the invention is not to be limited to the specific apparatus disclosed herein but is to be defined by the appended claims.

I claim:

1. A magnetic core register comprising a plurality of storage cores capable of assuming alternate stable magnetic states to represent binary information and having a coercive force threshold, winding means carried by each of said storage cores, a coupling core carrying a pair of inductively related windings, circuit means conductively connecting the winding means of a first pair of said storage cores in series with one of the coupling core windings, circuit means conductively connecting the winding means of a second pair of said storage cores in series with the other of the coupling core windings, and shift winding means carried by each of said storage cores and said coupling cores adapted to receive a timed sequence of shift pulses.

2. A magnetic core register comprising a plurality of storage cores capable of assuming alternate stable magnetic states to represent binary information and having a coercive force threshold, winding means carried by each of said storage cores, a coupling core carrying a pair of inductively related windings, circuit means conductively connecting the winding means of a first pair of said storage cores in series with one of the coupling core windings, circuit means conductively connecting the winding means of a second pair of said storage cores in series with the other of the coupling core windings, means to bias each of said storage cores toward saturation in one of said stable magnetic states, and shift winding means carried by each of said storage cores and said coupling cores adapted to receive a timed sequence of shift pulses.

3. A magnetic core shift register comprising a first plurality of storage cores capable of assuming alternate stable magnetic states and having a coercive force threshold, a second plurality of coupling cores capable of assuming alternate stable magnetic states, first and second windings mounted on each of said storage cores, first and second inductively related windings mounted on each of said coupling cores, circuit means conductively connecting said second windings of two of said storage cores in series with the first winding of one of said coupling cores and the second winding of another of said coupling cores, and means to bias each of said storage cores toward saturation in one stable magnetic state, said first winding on each of said storage cores adapted to receive a sequence of timed shift pulses.

4. A magnetic core shift register as defined in claim 3, wherein the second winding on each of said coupling cores includes a greater number of turns than the second winding on each of said storage cores, the second winding on each of said storage cores including a greater number of turns than the first winding on each of said coupling cores.

5. A magnetic core register comprising a series of pairs of storage cores each capable of assuming alternate stable magnetic states to represent binary information and having a coercive force threshold, a coupling core capable of assuming alternate magnetic states between adjacent pairs of storage cores, a first winding carried by each of the storage cores, first and second inductively related windings carried by each of the coupling cores, first circuit means conductively connecting the first windings of a first pair of storage cores in series with the first winding on one of the coupling cores and a second winding on another of the coupling cores, second circuit means conductively connecting the first windings of a second pair of storage cores in series with the second winding on the one coupling core to couple inductively the first storage cores to the second storage cores, first shift winding means carried by said other coupling core and one core of said first pair of storage cores, and second shift winding means carried by said other coupling core and the other core of said first pair of storage cores, said first and second shift winding means being adapted to receive a sequence of timed shift pulses alternately to transfer binary information stored in said first pair of storage cores through the one coupling core to the corresponding storage cores of said second pair.

6. A magnetic core register comprising a series of pairs of storage cores each capable of assuming alternate stable magnetic states to represent binary information and having a coercive force threshold, a coupling core capable of assuming alternate stable magnetic states between adjacent pairs of storage cores, a first winding carried by each of the storage cores, first and second inductively related windings carried by each of the coupling cores, first circuit means conductively connecting the first windings of the first pair of storage cores in series with the first winding on one of the coupling cores and a second winding on another of the coupling cores, second circuit means conductively connecting the first windings of a second pair of storage cores in series with the second winding on the one coupling core to couple inductively the first storage cores to the second storage cores, first shift winding means carried by said other coupling core and one core of said first pair of storage cores, second shift winding means carried by said other coupling core and the other core of said first pair of storage cores, and means to bias each of said storage cores towards saturation in one stable magnetic state, said first and second shift winding means being adapted to receive a sequence of timed shift pulses alternately to transfer the binary information stored in said first pair of storage cores to the corresponding storage cores of said second pair.

7. A magnetic core register comprising a series of pairs of magnetic storage cores each capable of assuming alternate stable magnetic states to represent binary information and having a coercive force threshold, a first winding and a shift winding on each of said storage cores, means to bias each of said storage cores towards saturation in one stable magnetic state, a plurality of coupling cores capable of assuming alternate stable magnetic states and coupling adjacent pairs of storage cores, an input winding and an output winding on each of said coupling cores, means connecting the first windings on a first pair of storage cores to the output winding on a first coupling core and to the input winding on a second coupling core, means connecting the output winding on said second coupling core to the first windings on a second pair of storage cores, a first shift winding on said first coupling core and the shift winding on one of said first pair of storage cores being adapted to receive a sequence of first timed shift pulses, a second shift winding on said first coupling core and the shift winding on the other of said first pair of storage cores being adapted to receive a sequence of second timed shift pulses alternating with the first shift pulses, so that the binary information stored in said first pair of storage cores is transferred through the second coupling core to the second pair of storage cores.

References Cited in the file of this patent

UNITED STATES PATENTS 2,735,021 Nilssen ............... Feb. 14, 1956

UNITED STATES PATENT OFFICE

CERTIFICATE OF CORRECTION

Patent No. 2,904,779 September 15, 1959

Louis A. Russell

It is hereby certified that error appears in the printed specification of the above numbered patent requiring correction and that the said Letters Patent should read as corrected below.

Column 1, line 23, for "bore" read -- core --; line 27, after "Since" insert -- the --.

Signed and sealed this 8th day of March 1960.

(SEAL)
Attest:

KARL H. AXLINE
Attesting Officer

ROBERT C. WATSON
Commissioner of Patents